United States Patent

Thomas et al.

[11] Patent Number: 6,024,901
[45] Date of Patent: Feb. 15, 2000

[54] METHOD FOR WINDSHIELD BREAK REPAIR

[75] Inventors: Jonathan P. Thomas, Maple Lake; Paul E. Syfko, Woodbury, both of Minn.

[73] Assignee: TCG International Inc., Burnaby, Canada

[21] Appl. No.: 09/089,529

[22] Filed: Jun. 3, 1998

Related U.S. Application Data

[62] Division of application No. 08/720,700, Oct. 2, 1996, Pat. No. 5,776,506.

[51] Int. Cl.[7] ........................................ B32B 35/00
[52] U.S. Cl. ........................... 264/36.21; 156/94; 425/12; 425/13
[58] Field of Search ............................ 264/36.21, 36.22; 156/94, 98; 427/140; 425/12, 13

[56] References Cited

U.S. PATENT DOCUMENTS

| | | |
|---|---|---|
| 3,562,366 | 2/1971 | Sohl . |
| 3,765,975 | 10/1973 | Hollingsworth . |
| 3,971,163 | 7/1976 | Trombley . |
| 3,988,400 | 10/1976 | Luhman, III . |
| 3,993,520 | 11/1976 | Werner et al. . |
| 4,032,272 | 6/1977 | Miller . |
| 4,047,863 | 9/1977 | McCluskey et al. . |
| 4,132,516 | 1/1979 | Story . |
| 4,200,478 | 4/1980 | Jacino et al. . |
| 4,231,494 | 11/1980 | Greenwood . |
| 4,249,869 | 2/1981 | Petersen . |
| 4,280,861 | 7/1981 | Schwartz . |
| 4,291,866 | 9/1981 | Petersen . |
| 4,385,015 | 5/1983 | Klettke . |
| 4,385,879 | 5/1983 | Wilkinson . |
| 4,419,305 | 12/1983 | Matles . |
| 4,455,010 | 6/1984 | Butler . |
| 4,569,808 | 2/1986 | Smali . |
| 4,597,727 | 7/1986 | Birkhauser, III . |
| 4,622,085 | 11/1986 | Yamada et al. . |
| 4,681,520 | 7/1987 | Birkhauser, III . |
| 4,744,841 | 10/1988 | Thomas . |
| 4,775,305 | 10/1988 | Alexander et al. . |
| 4,814,185 | 3/1989 | Jones . |
| 4,820,148 | 4/1989 | Anderson . |
| 4,921,411 | 5/1990 | Ottenheimer . |
| 4,954,300 | 9/1990 | Dotson . |
| 4,975,037 | 12/1990 | Freiheit . |
| 4,995,798 | 2/1991 | Ameter . |
| 5,069,836 | 12/1991 | Werner et al. . |
| 5,104,304 | 4/1992 | Dotson . |
| 5,116,441 | 5/1992 | Campfield, Jr. . |
| 5,122,042 | 6/1992 | Einiger . |
| 5,234,325 | 8/1993 | Hill . |
| 5,425,827 | 6/1995 | Campfield . |
| 5,429,692 | 7/1995 | Campfield . |
| 5,565,217 | 10/1996 | Beckert et al. . |
| 5,589,018 | 12/1996 | Campfield . |
| 5,614,046 | 3/1997 | Campfield . |

FOREIGN PATENT DOCUMENTS 0 296 671  12/1988  European Pat. Off. .

OTHER PUBLICATIONS

Liquid Resin International, Ltd. Catalog, 21 pages (Apr. 1, 1992).

The Glass Mechanix® brochure entitled "A Clear Path to Your Future Success," 8 pages (Undated).

*Primary Examiner*—Karen Aftergut
*Attorney, Agent, or Firm*—Merchant & Gould P.C.

[57] ABSTRACT

A windshield repair apparatus and method includes a fixture for holding an injector wherein the fixture includes plastic legs for slideably engaging a windshield during sliding movement of the fixture. A suction cup mechanism enables selective mounting of the apparatus to the windshield. The suction cup mechanism selectively positions the suction cup so as to not interfere with sliding movement of the windshield repair apparatus across the windshield, and allows for deployment of the suction cup against the windshield at the desired time. The fixture has engagement surfaces for the user's hand during handling of the windshield repair apparatus.

1 Claim, 7 Drawing Sheets

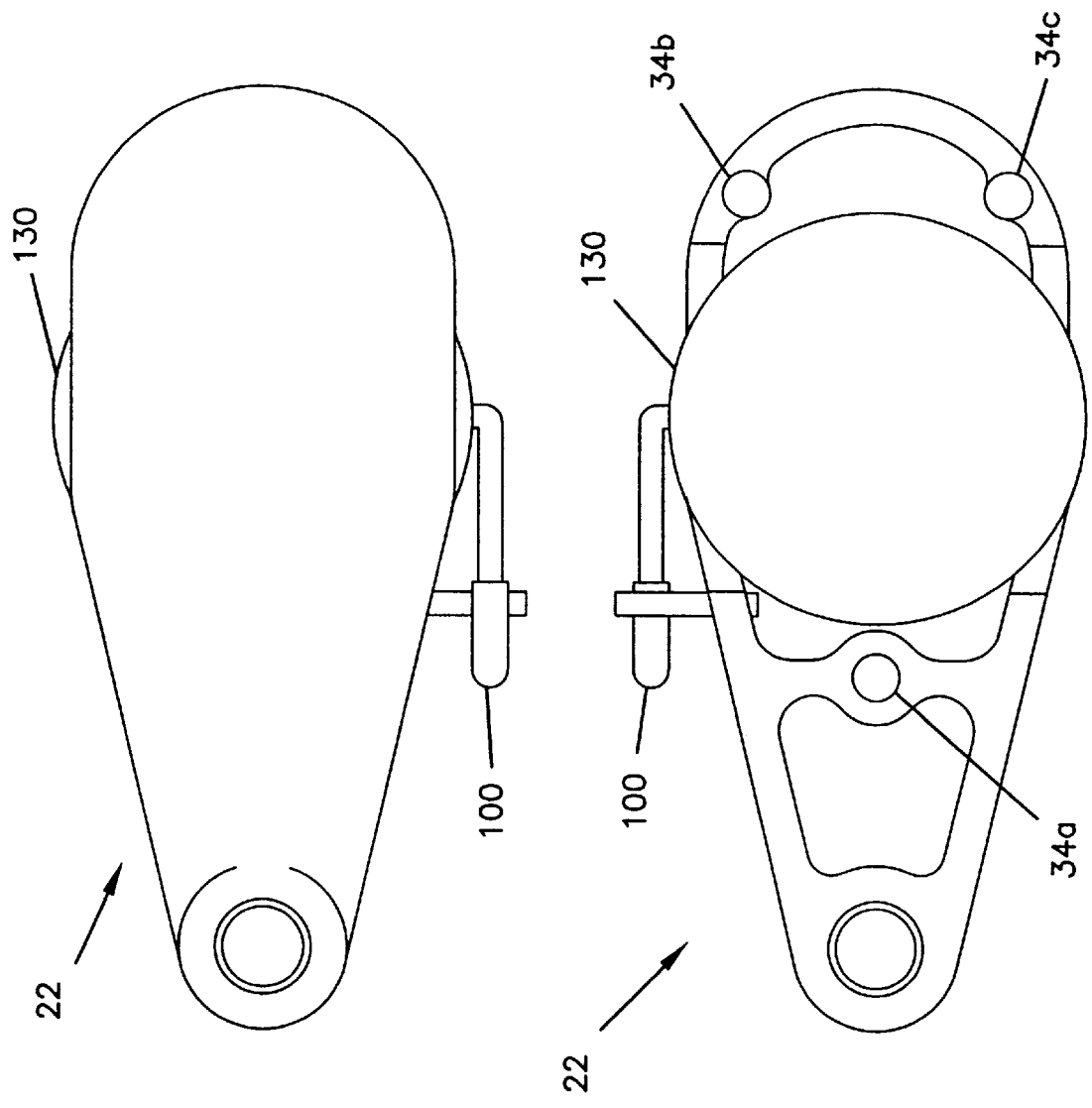

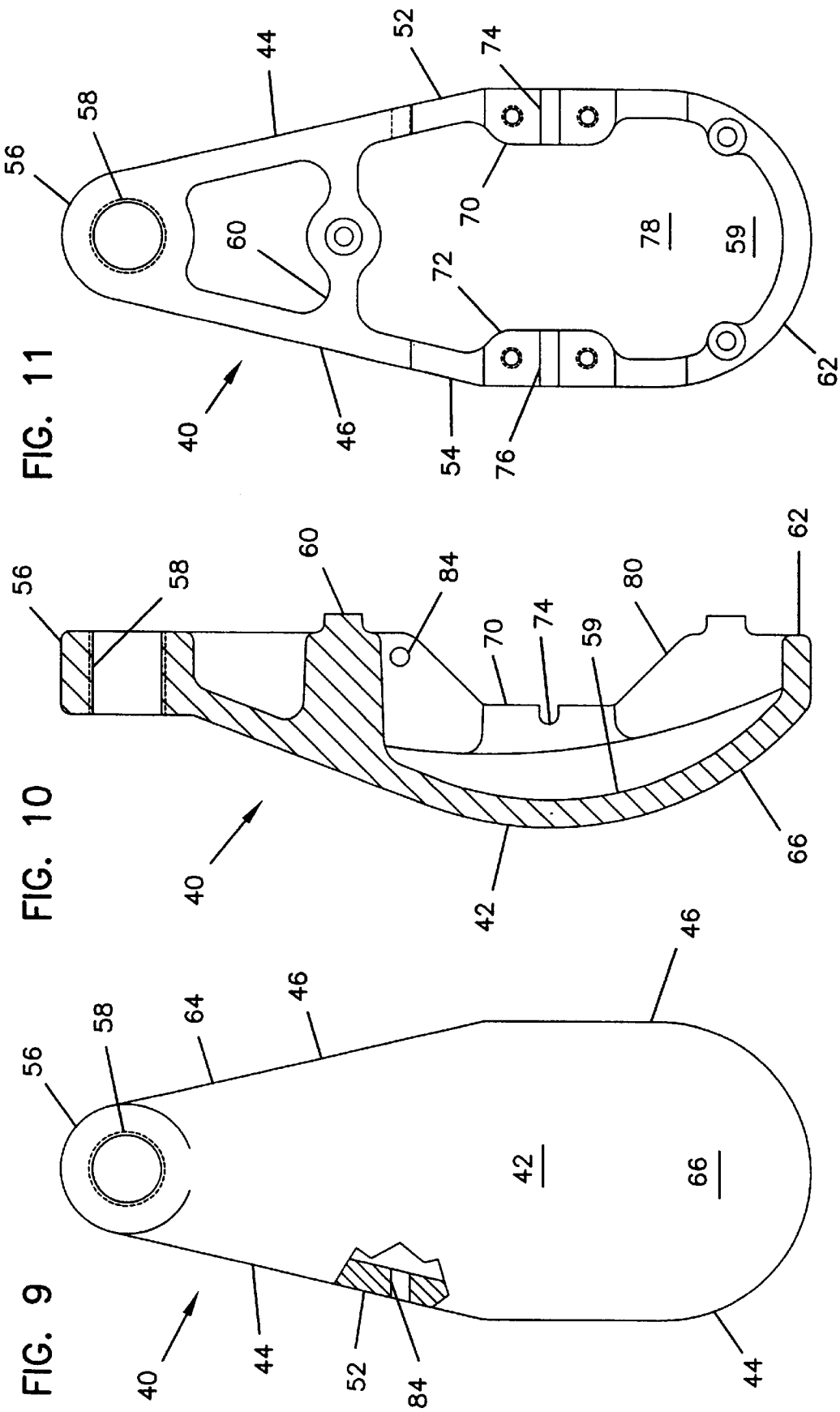

METHOD FOR WINDSHIELD BREAK REPAIR

This application is a Divisional of application Ser. No. 08/720,700, now U.S. Pat. No. 5,776,506, filed Oct. 2, 1996, which application(s) are incorporated herein by reference.

FIELD OF THE INVENTION

The present invention relates to apparatus and methods for repairing breaks in windshields.

BACKGROUND OF THE INVENTION

From time to time, a vehicle windshield will break, such as due to an object impacting against the windshield. A bull's-eye break may occur wherein the outer layer of safety glass incurs a break in the shape of an inverted cone. Cracks may extend from the bull's-eye break. Other break shapes and cracks may be incurred in addition to or instead of the bull's-eye break. The inside layer of safety glass is typically unbroken. U.S. Pat. No. 4,291,866, issued Sep. 29, 1981, the disclosure of which is hereby incorporated by reference, illustrates an apparatus usable to repair a break in a vehicle windshield. The apparatus disclosed in the '866 reference includes a support apparatus for supporting an injector held against the windshield so that repair material can be applied to the break site. A repaired windshield is desirable over replacement of the windshield which can be quite costly, and time consuming.

Various concerns arise in connection with repair of windshields. One area of concern relates to the ease of use of the windshield repair apparatus. In particular, the ease in which the apparatus can be moved between locations during repair of a crack is a concern. A further concern relates to the ease in which the apparatus can be held by the user. An ability to securely mount the apparatus to the windshield is also a concern.

There is a need in the prior art for apparatus and methods which address the above concerns and other concerns.

SUMMARY OF THE INVENTION

The present invention relates to a windshield repair apparatus including a support apparatus or fixture for holding an injector wherein the fixture includes slideable support legs for slideably engaging a windshield during sliding movement of the fixture. The present invention also relates to methods for sliding a windshield repair apparatus along the surface of the windshield during repair of a break.

Preferably, the windshield repair apparatus includes a suction cup to enable mounting of the fixture to the windshield. Preferably, the windshield repair apparatus includes a suction cup mechanism for use in selective positioning of the suction cup so as to not interfere with sliding movement of the windshield repair apparatus across the windshield, and to allow for deployment of the suction cup against the windshield at the desired time.

The present invention also relates to a hand held windshield repair apparatus including a fixture having a projecting holder for an injector and engagement surfaces for the user's hand during handling of the windshield repair apparatus.

BRIEF DESCRIPTION OF THE DRAWINGS

FIG. 6 is a top plan view of the fixture of FIG. 2;

FIG. 7 is a bottom plan view of the fixture of FIG. 2;

FIG. 9 is a top plan view of the main body of the fixture of the windshield repair apparatus of FIG. 1, with a portion shown in cross-section;

FIG. 10 is a cross-sectional side view of the main body of FIG. 9;

FIG. 11 is a bottom plan view of the main body of FIG. 9;

DETAILED DESCRIPTION OF THE PREFERRED EMBODIMENTS

Figure 1:
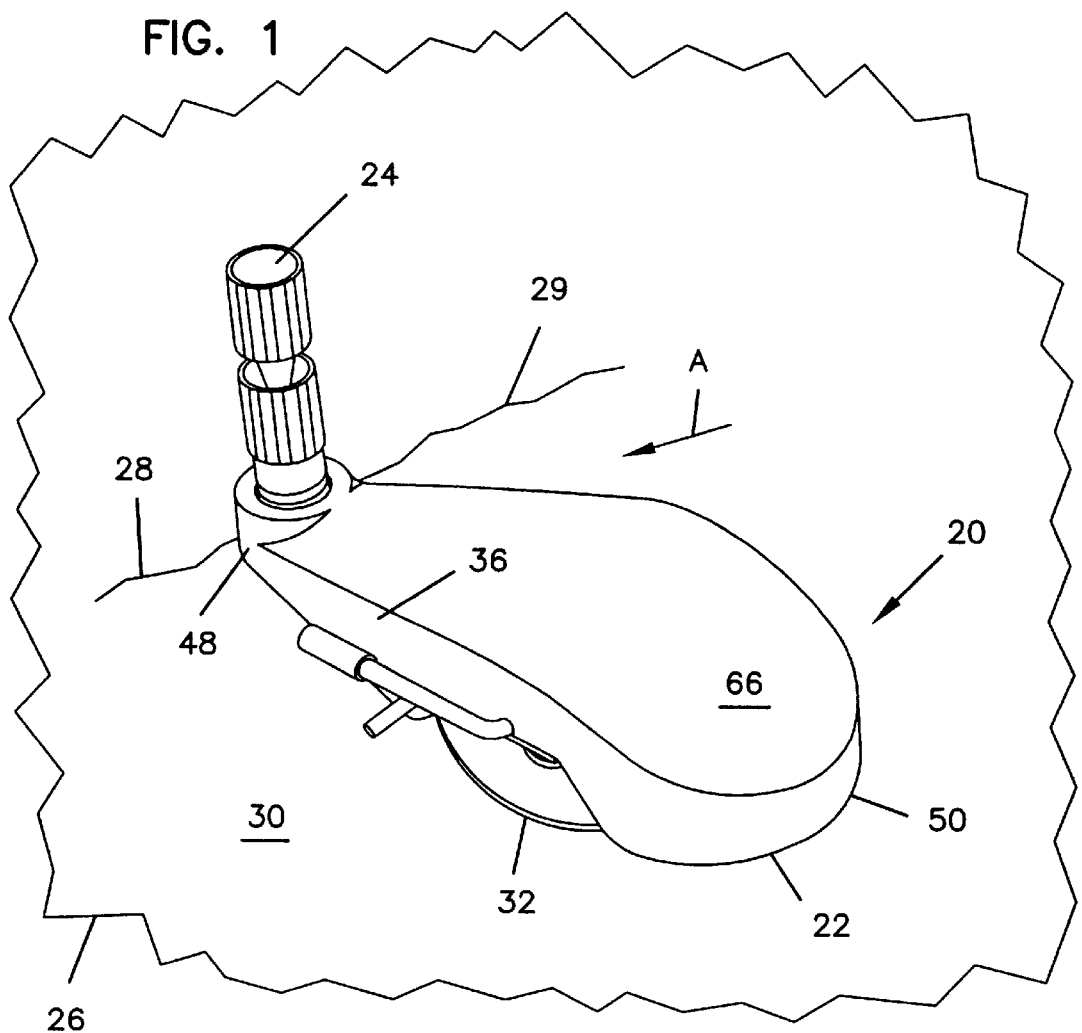
FIG. 1 is a perspective view of a first embodiment of a windshield repair apparatus in accordance with the invention.
Figure 2:
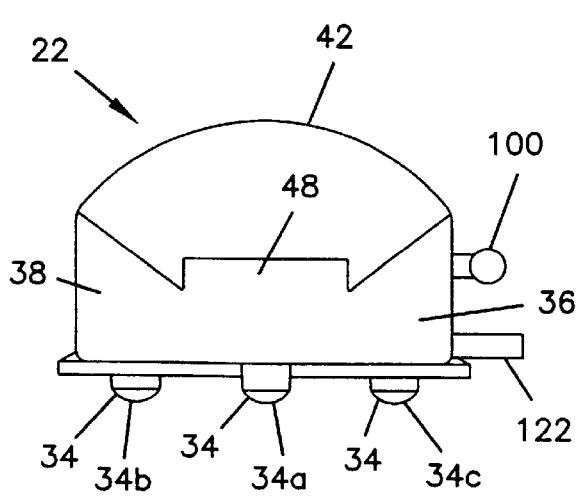
FIG. 2 is a front view of the fixture of the windshield repair apparatus of FIG. 1.
Figure 3:
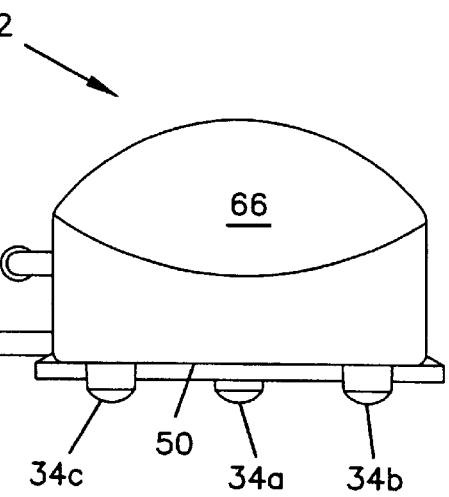
FIG. 3 is a back view of the fixture of FIG. 2.
Figures 4, 5:
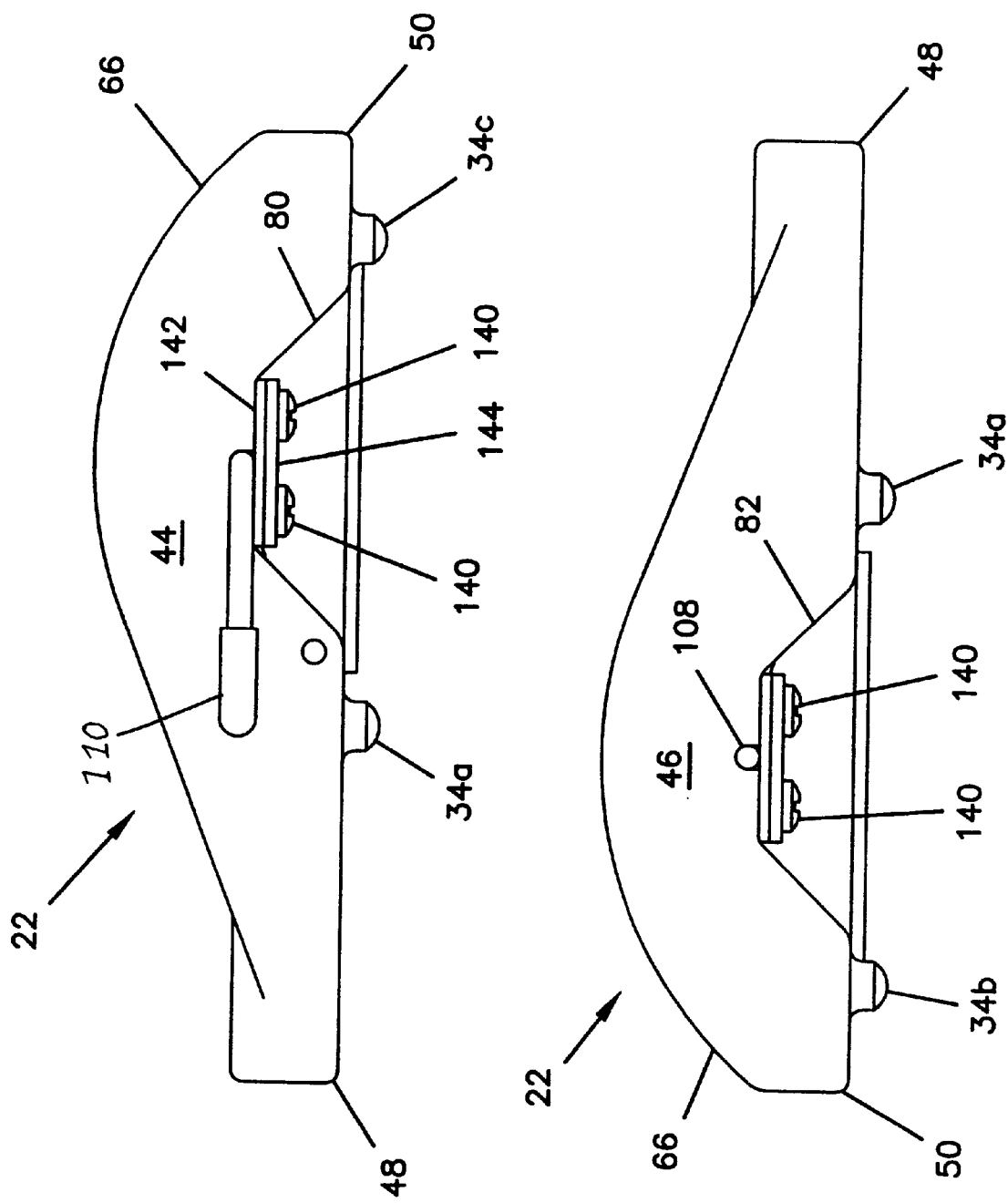
FIG. 4 is a right side view of the fixture of FIG. 2.
FIG. 5 is a left side view of the fixture of FIG. 2.

Referring now to FIGS. 1–16, a first embodiment of a windshield repair apparatus 20 is shown. Apparatus 20 includes a support apparatus or fixture 22 which holds an injector 24 for use in repairing a windshield. Fixture 22 holds injector 24 in position adjacent a break area 28 in a windshield 26 as shown in FIG. 1. Injector 24 can be used to apply a repair material, such as ultra-violet light curable plastic resin to break area 28. In FIG. 1, break area 28 includes an elongated crack 29.

Fixture 22 allows a user to appropriately position injector 24 such as when the user needs to move injector 24 along break area 28 during application of the resin, such as in the direction of arrow A in FIG. 1. Slideable movement is useful in the repair of elongated cracks, like edge cracks that extend from a center of the windshield to an edge. To allow sliding engagement of fixture 22 with top surface 30 of windshield 26, a plurality of slideable support legs 34 are provided on fixture 22. Fixture 22 also optionally includes a mounting mechanism to selectively secure fixture 22 and injector 24 adjacent to break area 28. Preferably, the mounting mechanism includes a suction cup mechanism 32 for selective mounting of fixture 22 to a top surface 30 of windshield 26.

Support legs 34 permit smooth sliding of fixture 22 along top surface 30 of windshield 26. Support legs 34 further do not scratch or otherwise damage windshield 26 during sliding engagement. Using the windshield as a guide, the user is able to slide fixture 22 along crack 29 while applying resin through injector 24. One preferred construction of legs 34 is plastic for the exterior surface engageable with windshield 26. In the preferred embodiment, three plastic legs 34a, 34b, and 34c are provided to support fixture 22 on windshield 26.

Fixture 22 includes a main body 40 having a top 42, opposed sides 44, 46, a nose or front 48, and a base 50 extending in the opposite direction to front 48. Main body 40 includes two side rails 52, 54 which form opposed sides 44, 46. A front boss 56 forms an injector mounting area. A threaded aperture 58 receives injector 24 in the embodiment illustrated in FIGS. 1–16. Other mounting arrangements are possible for mounting the injector to the fixture, such as slots and bayonets (see FIG. 17). Main body 40 further includes a bottom surface 59 and a cross rail 60 which forms a mounting location for first leg 34a. A rear rail 62 forms two mounting locations for second and third legs 34b, 34c.

Main body 40 further defines a neck area 64, positioned between injector 24 and suction cup mechanism 32. Neck area 64 defines two grasping surfaces 36, 38 for grasping of fixture 22 by a thumb and at least one finger of the user's hand. An upper rear tapered section 66 forms a portion of top 42 for receipt of the base of the user's palm. The grasping surfaces 36, 38 in neck area 64 are generally vertical when fixture 22 is placed on a horizontal surface, and upper rear tapered section tapers downwardly toward base 50. The grasping surfaces 36, 38 are shown as being at an angle to one another. Parallel surfaces, and curved surfaces are also possible. Preferably, main body 40 is made from metal, such as cast aluminum.

Suction cup mechanism 32 includes two mounting platforms 70, 72 of main body 40 of fixture 22 which allow for mounting of a rotatable crank 100. Crank 100 mounts a resilient suction cup 130 to main body 40. Crank 100 includes a lever portion 102 which rotates an offset section 104 to move suction cup 130 toward and away from windshield 26 during use. End sections 106, 108 define a rotation axis for crank 100. Offset section 104 is offset 90 degrees from the direction faced by lever portion 102. End sections 106, 108 are mounted in grooves 74, 76 in mounting platforms 70, 72 of main body 40. Chamber 78 of main body 40 receives a post 132 of suction cup 130. A cup portion 134 of suction cup 130 extends downwardly from post 132 for engagement with windshield 26. A protective cap 110 can be placed on the free end of lever portion 102 of crank 100. Right handed users may prefer the location of crank 100 along side 44. Crank 100 can be flipped so that lever portion 102 projects from side 46, instead of side 44, for left handed users.

Side rails 52, 54 of main body 40 further define access windows 80, 82 to allow a user to pry an outer edge 136 of cup portion 134 of suction cup 130 away from windshield 26 when the user decides to disengage suction cup 130 from windshield 26. Offset section 104 of crank 100 is rotatably positioned in a hole 138 through post 132 of suction cup 130 to mount suction cup 130 to crank 100. Mounting platforms 70, 72 each receive two screws 140, a spacer 142 and a mounting plate 144. Each mounting plate 144 is positioned to trap one of spacers 142 between end sections 106, 108 and each mounting plate 144. Spacers 142 are made of a material which allows for rotation of end sections 106, 108 of crank 100, such as nylon. Spacers 142 function as a wear pad for end sections 106, 108 of crank 100.

A pin 122 is positioned in an aperture 84 of main body 40 and functions as a stop for lever portion 102 of crank 100. Preferably, pin 122 is press fit into aperture 84.

Slideable legs 34a, 34b, and 34c (collectively 34) are mounted to main body 40 and space main body 40 from windshield 26 when the legs are engaged with top surface 30 of windshield 26. Preferably, suction cup 32 can be retracted away from top surface 30 such that only the legs engage the windshield. This facilitates sliding movement of fixture 22 along the windshield. Preferably, legs 34 are made from a material which slides easily along the surface of a windshield. Specifically, a material having a low coefficient of sliding friction against a windshield is preferred. For example, an acetyl resin, such as Delrin can be used.

Legs 34 can be constructed in rivet-like shapes 148 (see FIG. 8) and conveniently mounted to main body 40. A shaft 150 of rivet 148 is received within an aperture of main body 40. Head 152 projects from main body 40 and has a rounded configuration. Rivets 148 can be press-fit into main body 40, and can be replaced as desired if they became worn or damaged.

Figure 8:
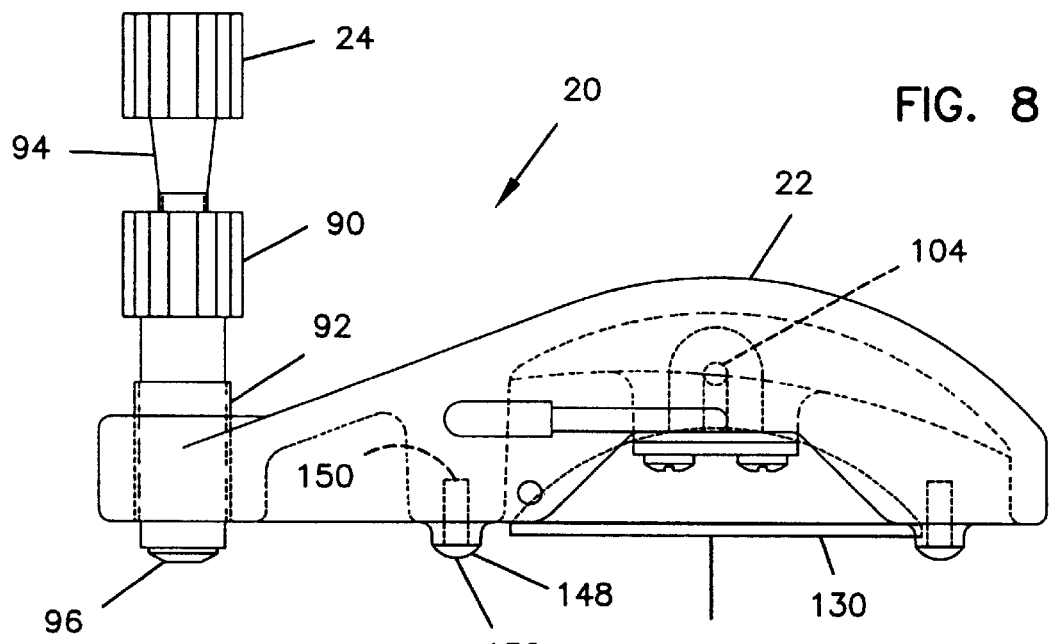
FIG. 8 is a right side view of the windshield repair apparatus of FIG. 1 showing various internal features in dashed lines.
Figure 16:
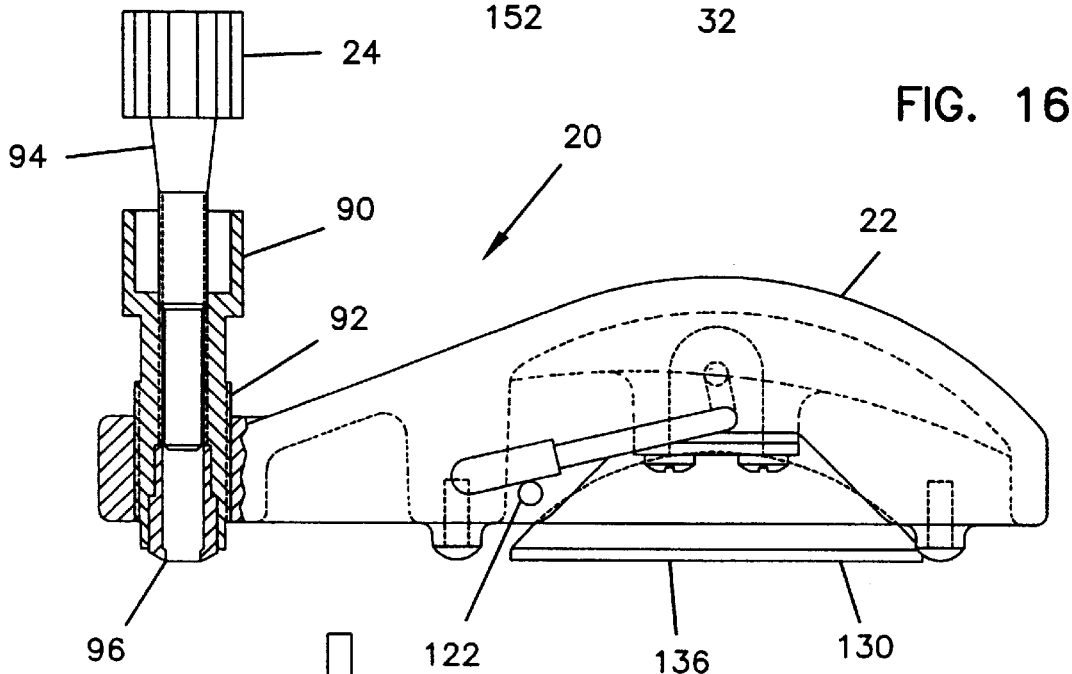
FIG. 16 shows the windshield repair apparatus of FIG. 1 with the suction cup in the deployed position, and the crank in the overcenter position.
Figure 12:
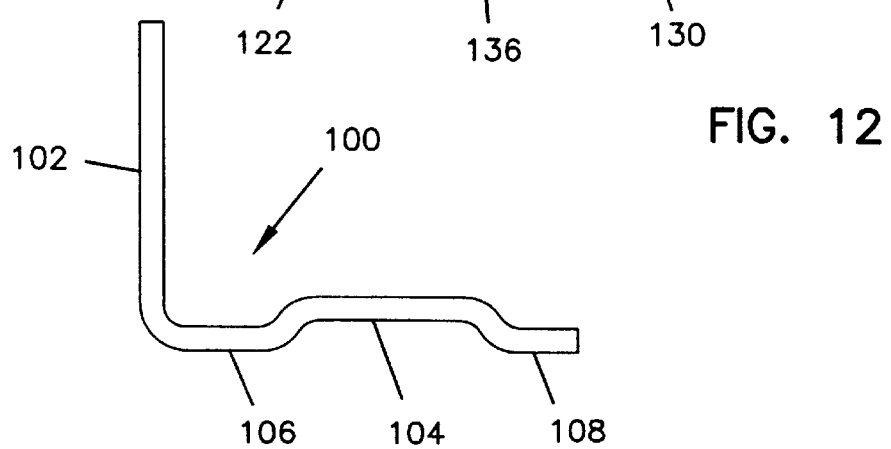
FIG. 12 shows the crank of the suction cup mechanism of the windshield repair apparatus of FIG. 1, with the lever portion rotated 90 degrees from a remainder of the crank for illustration purposes.
Figure 13:
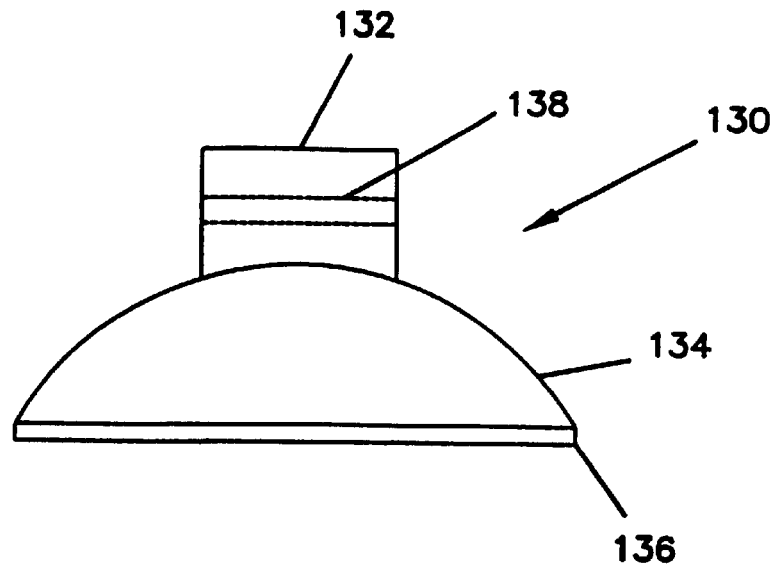
FIG. 13 shows the suction cup of the suction cup mechanism.
Figure 14:
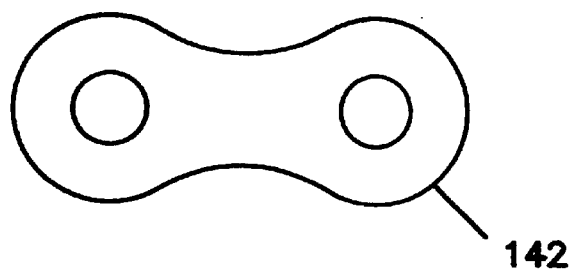
FIG. 14 shows the spacer of the suction cup mechanism.
Figure 15:
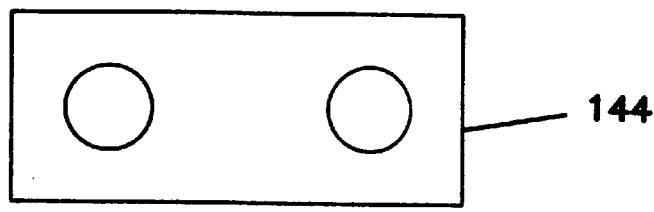
FIG. 15 shows the mounting plate of the suction cup mechanism.

With reference to FIGS. 8 and 16, injector 24 includes a body 90 with outer threads 92 for threaded engagement with threaded aperture 58 of fixture 22. A plunger 94 with external threads engages internal threads in body 90 moves relative to body 90. During use, liquid resin is contained within body 90. A resilient tip 96 of injector 24 sealably engages top surface 30 of windshield 26. By movement of plunger 94, pressure is applied to the resin within body 90 which is expelled at tip 96 into break area 28.

Windshield repair apparatus 20 can be moved along break area 28 while resin is being applied to break area 28. Slideable legs 34 allow for windshield repair apparatus 20 to conveniently slide along top surface 30 of windshield 26. If the user desires to securely mount windshield repair apparatus 20 to top surface 30 of windshield 26, the user activates suction cup mechanism 32 by rotating lever portion 102 of crank 100 away from pin 122 to deploy suction cup 130 into engagement with top surface 30 of windshield 26. Lever portion of crank 100 is then rotated back toward pin 122 so as to draw post 132 of suction cup 130 away from top surface 30 leaving edge 136 of suction cup 130 engaged with the windshield and forming hold down suction or vacuum between suction cup 130 and top surface 30 of windshield 26. Crank 100 can be placed in the overcenter position as shown in FIG. 16. The hold down suction pulling on suction cup 130 may draw crank 100 into the overcenter position if the user places lever portion 102 so that offset section 104 is just past top dead center. Pin 122 prevents lever portion 102 from rotating into contact with windshield 26.

Windshield repair apparatus 20 can be used as a slideable structure with the suction cup 130 engaged with the top surface of the windshield if the suction cup is lubricated with a material, such as water-based lubrication gel, that permits sliding engagement of the suction cup with the windshield. Alternatively, and more preferred, windshield repair apparatus 20 can be used as a slideable structure where no suction is applied, and only sliding engagement of the legs with the windshield occurs. If desired, the suction cup can be activated to securely mount the apparatus to the windshield wherein no sliding is permitted. Such selective mounting, or parking, is useful when the user needs to apply curing film to sections of the break area already filled with resin, to cure a break area in sections, or to trouble spot, such as if the user needs to further manipulate the windshield, such as with a crack spreader bar. The suction cup can be released by prying edge 136 of suction cup 130 away from windshield 26 to remove the hold down vacuum. Suction cup 130 returns to its normal retracted position since no suction is pulling down on cup portion 134. Some adjustment of crank 100 may be desirable to place lever arm 102 in a horizontal position to assure suction cup 130 is in its highest retracted position.

Various alternate injectors can be utilized with fixture 22, as desired. The system shown in FIGS. 1–16 utilizes an injector which threadably mounts to fixture 22. Alternatively, the injector can mount with other mounting arrangements such as disclosed in U.S. application Ser. No. 08/405,141, now U.S. Pat. No. 5,565,217, the disclosure of which is incorporated by reference.

Figure 17:
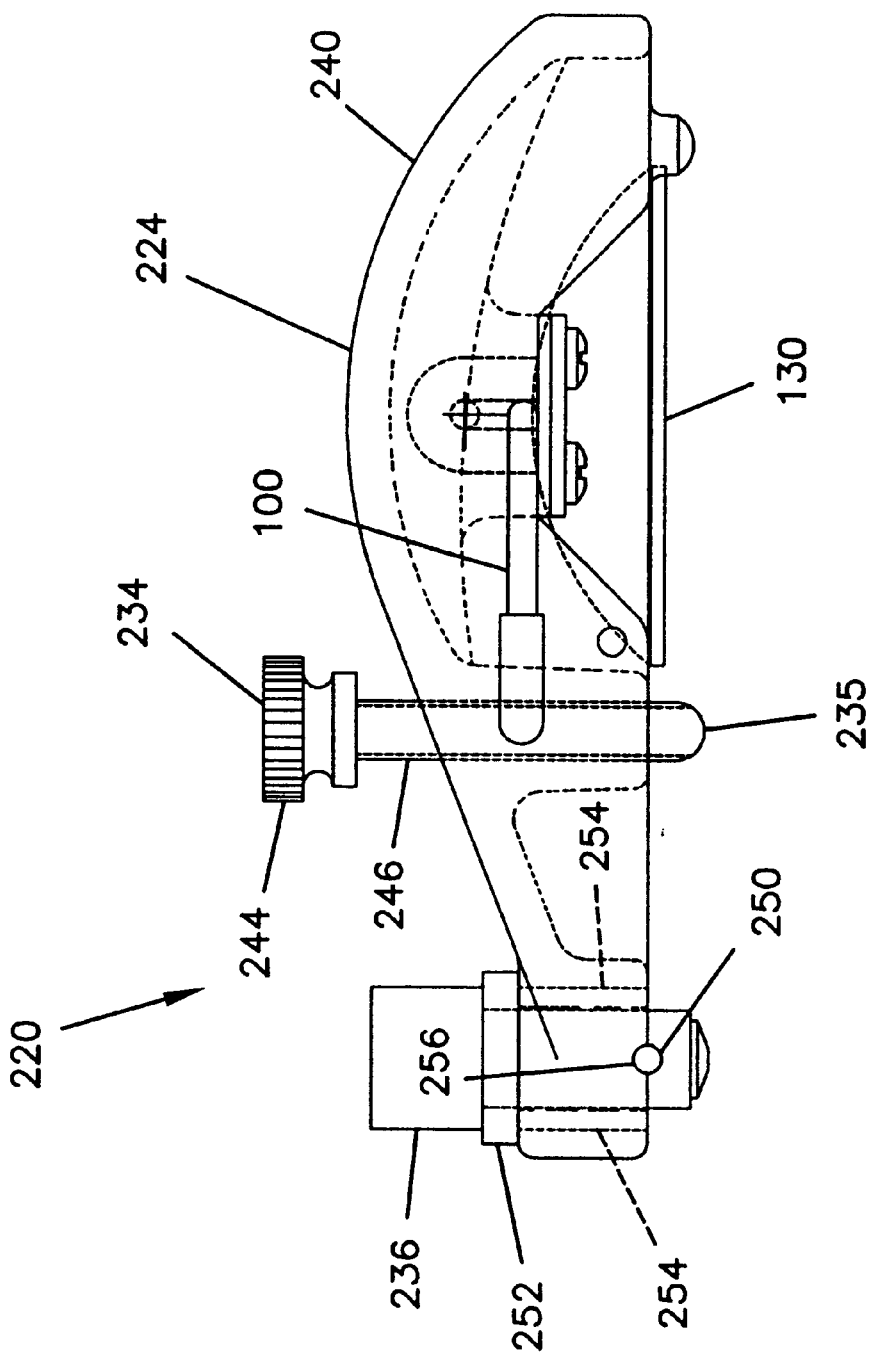
FIG. 17 is a right side view of a second embodiment of a windshield repair apparatus in accordance with the invention, including an adjustable leg.

Referring now to FIG. 17, an alternative embodiment of a windshield repair apparatus 220 is shown having a fixture 224 including an adjustable leg 234. Adjustable leg 234 is useful when rotation or adjustment of injector 236 is not convenient, or possible. Alternatively, adjustable leg 234 can be utilized for adjustability in combination with an adjustable injector. Adjustable leg 234 is threadably mounted to a main body 240. Rotation of a knob 244 rotates threaded shaft 246 of leg 234 to adjust the relative positions for leg 234 and main body 240. Preferably, at least tip 235 of leg 234 is a material which slides easily against a windshield. Preferably, leg 234 is made of plastic, such as Delrin acetyl resin.

For the embodiment of FIG. 17, injector 236 is a nonadjustably mounted injector. Injector 236 mounts with two oppositely facing bayonets 250 and a resilient foam ring 252 like that described in U.S. Pat. No. 5,565,217. Foam ring biases each bayonet 250 into a groove 256. To mount or release injector 236, injector 236 is rotated about its longitudinal axis to align bayonets 250 with vertical slots 254.

Fixtures 22, 224 allow the smaller injectors 24, 236 to be handled by users in a mobile fashion easier than merely handling the injectors. A fixture sized at about 5.0 inches long, about 2.0 inches wide, and about 1.5 inches high fits into a user's hand to be conveniently maneuvered across the windshield in a sliding manner. Opposed grasping surfaces 36, 38 of vertical sides 44, 46 in neck region 64, and upper rear tapered section 66 form hand engagement surfaces for convenient and secure handling by the user. Fixtures 22, 224 minimize projecting levers and parts along top 42 and the various sides to present appropriate grasping surfaces and an appropriate size to fit in a user's hand.

It is to be understood, that even though numerous characteristics and advantages of the invention have been set forth in the foregoing description, together with details of the structure and function of the invention, the disclosure is illustrative only, and changes may be made in detail, especially in matters as such shape, size, and arrangement of the parts within the principles of the invention to the full extent indicated by the broad general meaning of the terms which the appended claims are expressed.

What is claimed is:

1. A method for repairing a windshield comprising the steps of:

sliding a windshield repair apparatus along a top surface of a windshield with a plurality of support legs extending from a bottom of the apparatus for sliding engagement with the windshield;

while sliding the windshield repair apparatus along the top surface, injecting liquid resin into a break area of the windshield; and then selectively stopping the sliding of the windshield apparatus by engaging the top surface of the windshield with a suction cup extending from the bottom of the windshield repair apparatus.

\* \* \* \* \*